United States Patent [19]
Piccirilli

[11] Patent Number: 6,108,899
[45] Date of Patent: Aug. 29, 2000

[54] BRAZING FIXTURE FOR A HEAT EXCHANGER

[75] Inventor: Davide F. Piccirilli, Livonia, Mich.

[73] Assignee: Visteon Global Technologies, Inc., Dearborn, Mich.

[21] Appl. No.: 09/317,602

[22] Filed: May 24, 1999

[51] Int. Cl.$^7$ .................................................. B23P 15/00
[52] U.S. Cl. ............................ 29/726; 29/281.4; 29/727; 228/212
[58] Field of Search .......................... 29/726, 727, 281.1, 29/281.4, 281.6; 228/182, 183, 212, 213; 269/43, 229, 234

[56] References Cited

U.S. PATENT DOCUMENTS

| | | |
|---|---|---|
| 3,894,580 | 7/1975 | Chartet . |
| 4,700,469 | 10/1987 | Kroetsch et al. ........................ 29/726 |
| 4,743,003 | 5/1988 | Dietlein .................................... 269/43 |
| 5,165,163 | 11/1992 | Pardi . |
| 5,450,997 | 9/1995 | Turak et al. . |

*Primary Examiner*—Irene Cuda
*Attorney, Agent, or Firm*—Charles Ellerbrock

[57] ABSTRACT

An apparatus for holding a heat exchanger core during a manufacturing process is disclosed. The core includes a first and second side support member disposed on opposite sides of an assembly of a plurality of interleaved tubes and fins and fluid manifolds on opposite ends of the tubes. The apparatus includes a pair of nested clamps. One clamp is disposed over the side supports and the second is disposed over the fluid manifolds. The clamps are easily placed over the core and easily removed after brazing.

9 Claims, 3 Drawing Sheets

BRAZING FIXTURE FOR A HEAT EXCHANGER

BACKGROUND OF THE INVENTION

1. Field of the Invention

The present invention relates generally to an apparatus for holding a heat exchanger core during a manufacturing operation.

2. Background Information

Typical heat exchanger cores are manufactured by assembling a plurality of tubes interleaved with fins between a pair of side support members. The core is precompressed by a variety of known methods prior to brazing to maintain the tube and fins in proper relationship. One known method is to precompress the core with one or more steel bands completely surrounding the core before brazing. After banding, the core is inserted into a furnace and heated until it brazes together. After brazing, the steel bands are cut from the core and discarded, resulting in a large amount of waste. In addition, these bands often distort and/or skew the core which can result in leaks and/or improper vehicle fit.

Other types of brazing fixtures have been proposed such as that shown in U.S. Pat. No. 5,165,163, assigned to the assignee of the present invention and which is shown in FIG. 1. The brazing fixture 10 includes a plurality of brazing stations 12 each having a pivotal lever 14 which applies a compressive force against one of the side support members 16 of the heat exchanger 18 while the other side support member 20 is held stationary in the fixture 10. The fixtures 10 typically hold up to six heat exchangers. However, these fixtures tend to become corroded in the brazing atmosphere, reducing the effectiveness of the compressive force applied against the core. Also, these fixtures usually are not used upstream of the braze process due to sheer weight and mass. Heating these fixtures in a braze furnace requires much energy due to their large mass. This adds expense and delay to the manufacturing process.

A third type of brazing fixturing is proposed in U.S. Pat. No. 3,894,580. In this fixture, a pair of generally parallel ties extend between each of the side support members to fix the core in a predetermined position prior to the brazing operation. The disadvantages of using the generally parallel ties is that unless an elaborate and complicated clamping mechanism, such as shown in U.S. Pat. No. 3,894,580 is utilized on each end of the ties, the heat exchanger core can still skew as a result of normal process handling and/or shrinkage and thermal cycling during the brazing operation. This skewing or misalignment of the heat exchanger core often results in deleterious effects upon the core such as leaking and/or improper vehicle fit.

U.S. Pat. No. 5,450,997, also assigned to the assignee of the present invention, overcomes the problems associated with some prior art brazing fixtures by providing a pair of rod members which engage the side support members of the heat exchanger. The rod members are diagonally placed in an overlapping crosswise relationship to prevent skewing. However, these rod members require locating holes be formed in the side support members which is not always possible.

It would, therefore, be advantageous to provide an effective, simple fixturing apparatus which can easily be used during the fabrication, processing, and brazing of the heat exchanger core to prevent the skewing or misalignment of the heat exchanger core and which minimizes the amount of heat energy required.

It is an object of the present invention to provide a brazing apparatus which applies a constant compressive force during the brazing process in a much more cost effective and less complicated structure.

SUMMARY OF THE INVENTION

The present invention overcomes the disadvantages of the prior art by providing an apparatus for holding a heat exchanger core during a manufacturing process, the core including first and second side support members disposed on opposite sides of an assembly of a plurality of interleaved tubes and fins and a first and second fluid tank disposed on opposite ends of the tubes. The apparatus comprises a first clamp disposed between the first and second side support members, the first clamp including a pair of leg members and a bight portion interconnecting the leg members. Each of the leg members has a contact portion and an outwardly depending end portion. The contact portion contacts the side support members and applies a compressive force therebetween. The bight portion includes a stepped portion extending above the plane of the bight portion, the stepped portion being configured to prevent rotation of the core during washing.

The apparatus of the present invention also includes a second clamp extending between the first and second fluid tank and configured to apply a compressive force therebetween. The second clamp includes a pair of leg members and a bight portion interconnecting the leg members. Each of the leg members has a contact portion to contact the manifolds and apply a compressive force therebetween. The bight portion includes a stepped portion extending above the plane of the bight portion.

The first and second clamps apply a constant compressive force in two perpendicular directions against the core to hold the core together in a predetermined position during the manufacturing process. The first and second clamps are removed easily from the heat exchanger core after the manufacturing operation is completed.

These and other objects, features and advantages of the present invention will become apparent from the following drawings, detailed description, and claims which follow.

DETAILED DESCRIPTION OF THE PREFERRED EMBODIMENTS

Figure 1:
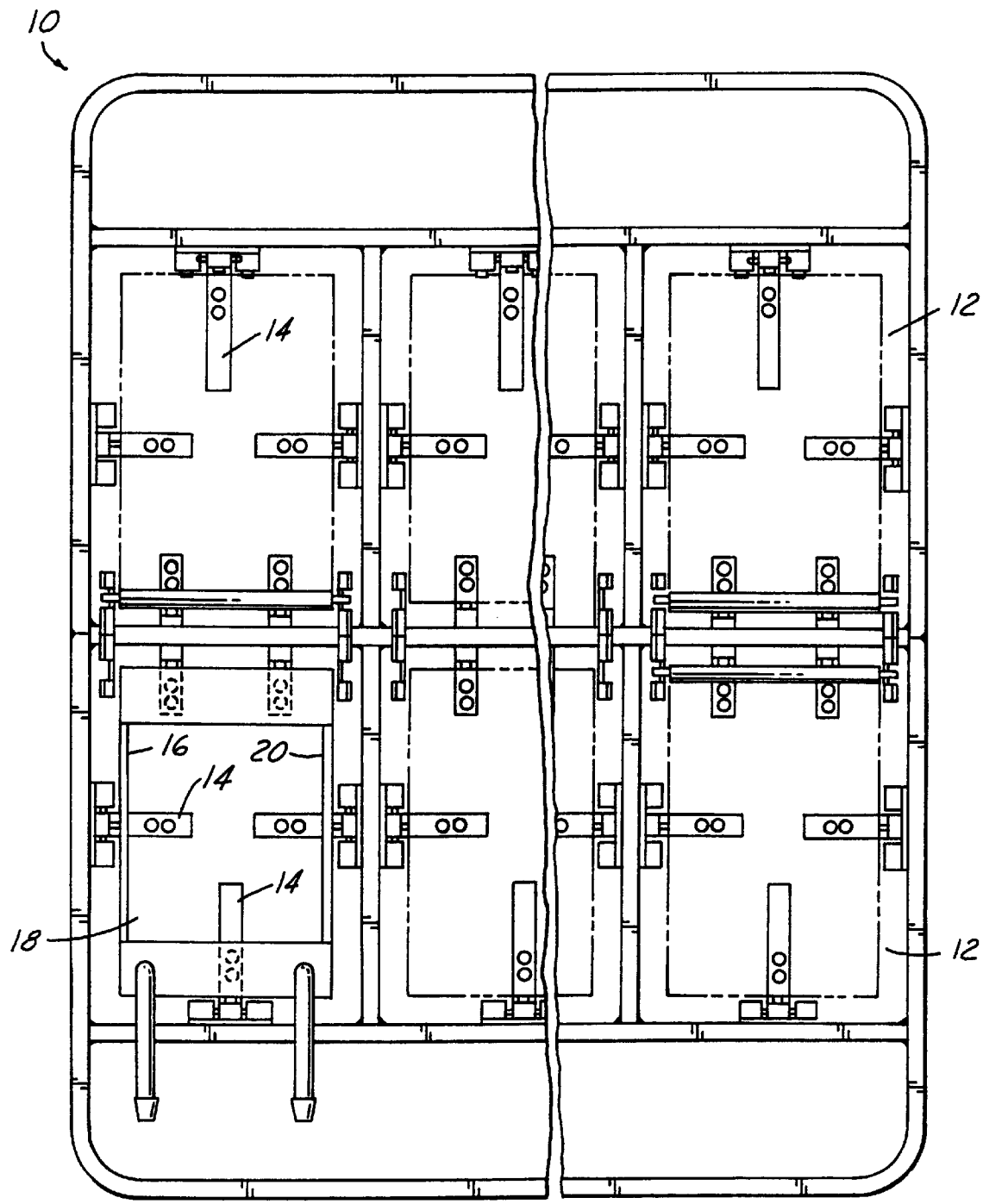
FIG. 1 is a perspective view of a prior art brazing fixture for holding heat exchanger cores during brazing.
Figure 2:
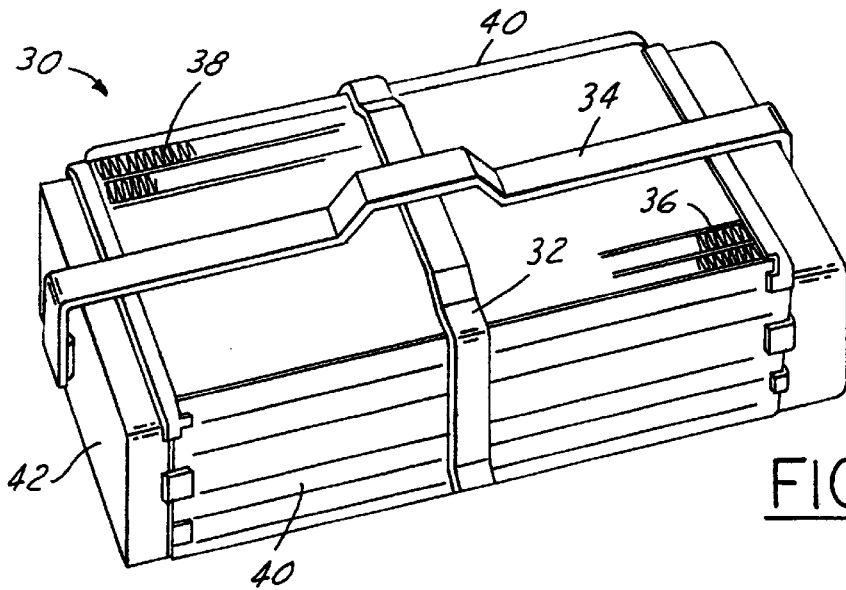
FIG. 2 is a perspective view of a heat exchanger core assembled with a brazing fixture apparatus structured in accord with the principles of the present invention.
Figure 4:
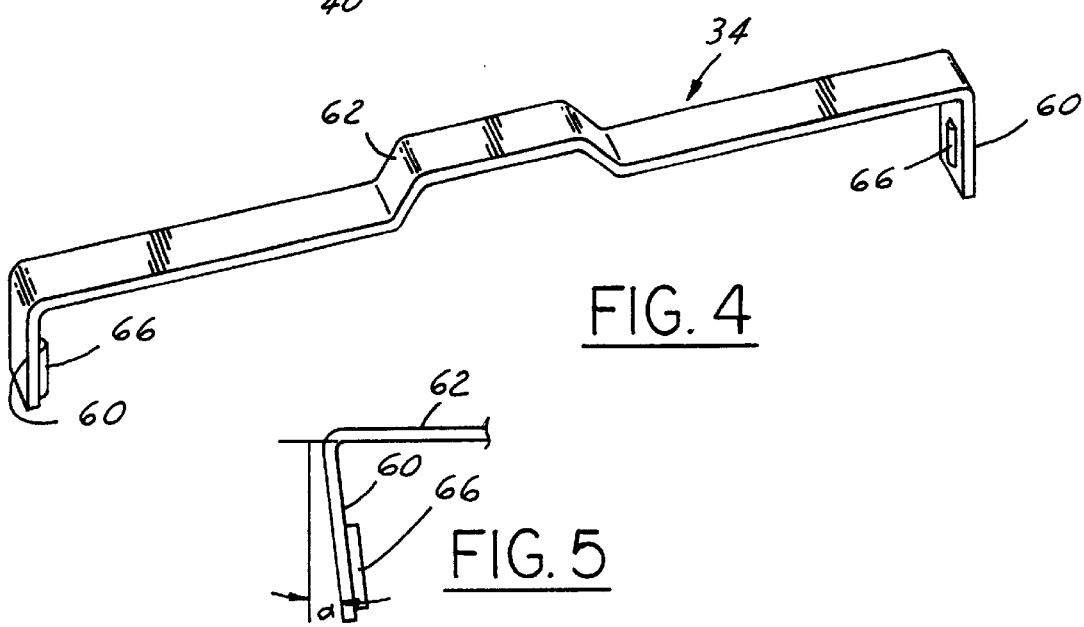
FIG. 4 is a perspective view of a second clamp member of the brazing fixture of the present invention.

Referring now to the drawings, FIG. 2 shows a heat exchanger, such as a heater core 30, held by two clamps 32, 34. The heater core 30 includes a plurality of interleaved tubes 36 and fins 38 disposed between a pair of side supports 40. Fluid manifolds (or tanks) 42 are secured in fluid communication to the tubes 36 in known fashion. The heater core 30 shown in FIG. 2 is ready for brazing. The clamps 32, 34 provide a compressive force in orthogonal directions to hold the core together during the brazing process. After brazing, the clamps 32, 34 are removed and the core is a fully brazed, completed structure. It should also be apparent to those skilled in the art that the coefficient of thermal expansion of the clamps 32, 34 must be different, or less than the coefficient of thermal expansion of the plurality of interleaved tubes and fins of the heater core 30, so that a compressive force can be maintained against the core by the clamps to hold the heater core in its predetermined position during the brazing process.

Figure 3:
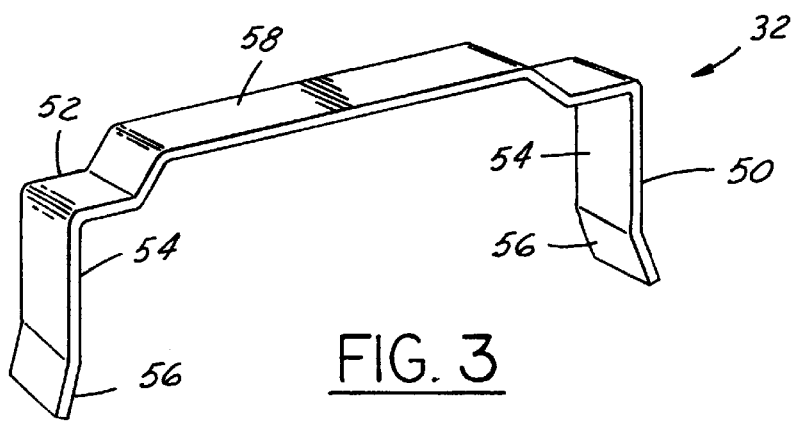
FIG. 3 is a perspective view of one clamp member of the brazing fixture of the present invention.

The first clamp 32 extends between side support members 40 while the second clamp extends between fluid manifolds 42. As shown in FIG. 3, the first clamp 32 is generally U-shaped and includes a pair of leg members 50 and a bight portion 52 interconnecting the leg members 50. Each leg member 50 includes a contact portion 54 and an outwardly end portion 56. The contact portions of each leg member 54 contacts the side supports 40 to provide a compressive force on the heater core in a direction perpendicular to the longitudinal axis of the tubes 36. The outwardly extending ends 56 of the first clamp do not provide clamping force to the core. Rather, these ends 56 provide a cam-like surface to ease installation of the clamp 32 over the side supports. Also, the ends 56 minimize the surface area of the clamp making contact with the side supports. This allows for easier removal of the clamp after brazing, since the ends 56 do not braze to the core.

The first clamps 32 also includes the bight portion 52 extending between the leg members 50. The bight portion 52 includes an elevated, or stepped portion 58. The stepped portion 58 provides a convenient handle for an operator to use when installing or removing the clamp 32 on the core 30. The clamp 32 typically is made as a single stamped member.

Figure 8:
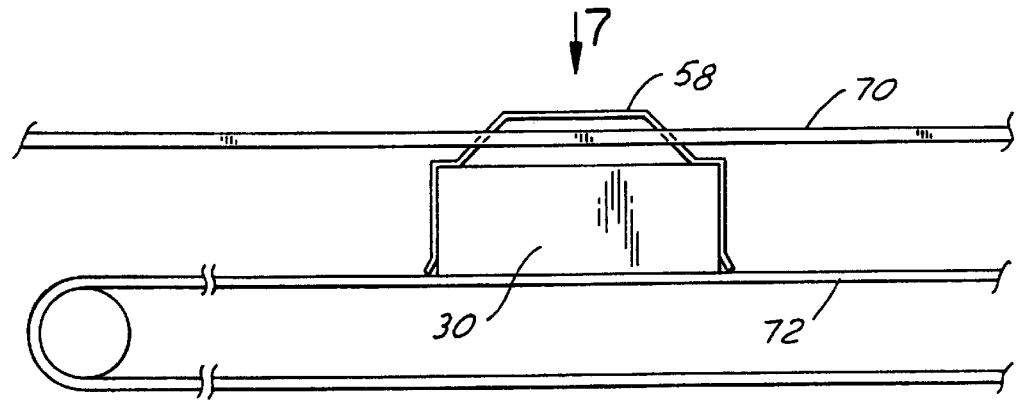
FIG. 8 is a side elevational view of the heat exchanger core of FIG. 7 during a washing process.
Figure 7:
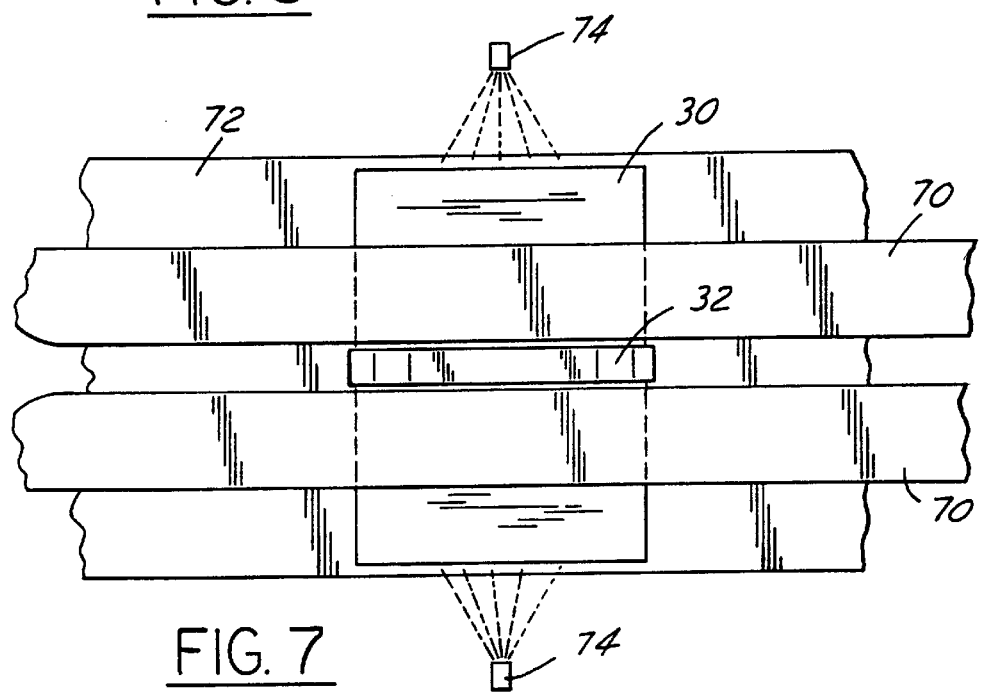
FIG. 7 is a top plan view of a heat exchanger core during a washing process.

The first clamp 32 also provides a second function. As will be explained in greater detail below, the stepped portion 58 of the first clamp 32 prevents the core 30 from rotating while the core is subjected to a washing operation. As shown in FIGS. 7 and 8, the stepped portion 58 of the clamp 32 rides between a pair of wash rails 70 located above a moving conveyor assembly 72. Prior to be being brazed, the core 30 is subjected to a washing process in which a pair of spray jets 74 force a cleaning solution over the entire core 30. This spray tends to cause the core to rotate or be knocked off the conveyor assembly. However, the stepped portion 58 keeps the core 30 in place. The length of the stepped portion 58 should extend over a majority of the length of the clamp to provide increased stability while the core is being washed.

Figure 5:
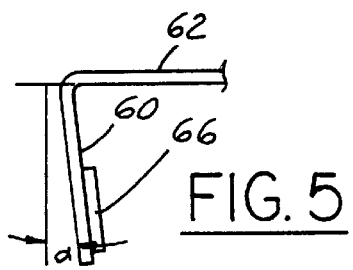
FIG. 5 is a cross-sectional view of the clamp of FIG. 4, taken along line 5—5.

The second clamp 34 is structured very similar to the first clamp 32. The second clamp 34 is also generally U-shaped and includes a pair of depending leg members 60 and a bight portion 62 extending between and connecting the leg members 60. As shown in FIG. 5, each leg member 60 is disposed at an acute angle, α, to the longitudinal plane of the bight portion. This angle is typically less than ten degrees. The second clamp 34 extends between the fluid manifolds 42 and provides a compressive force parallel to the longitudinal axis of the tubes 36. The leg members 60 include a contact segment comprising a raised bump portion 66. This bump portion 66 contacts each of the manifolds 42. The bump portion 66, in conjunction with the angled leg portion, provides a single point of contact by the second clamp 34 against the manifolds 42. This structure minimizes the amount of surface area of the clamp contacting the manifolds 42 to prevent brazing of the clamp to the manifold. The bump portion is formed integrally with each leg member 60. Alternatively, the bump can be secured to the leg members by welding or adhesively fastening it thereto.

The bight portion 62 extends between the leg members 60. The bight portion 62 includes an elevated, or stepped portion 68. The stepped portion 68 extends over the stepped portion 58 of the first clamp 32 to provide a nested configuration. The stepped portion 68 of the second clamp also provides a convenient handle for an operator to use when installing or removing the clamp 34 on the core 30. The clamp 34 typically is made as a single stamped member.

Figure 6:
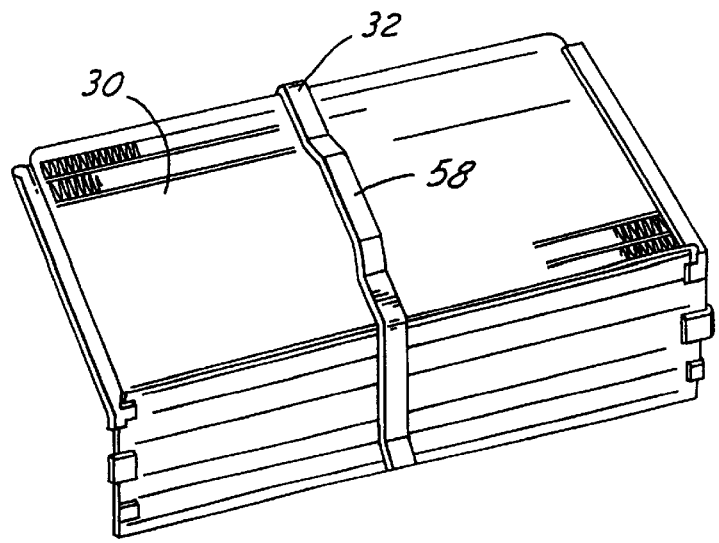
FIG. 6 is a perspective view of a heat exchanger core prior to a brazing operation, using a clamp member of the present invention.

A method of assembling a heater core 30 using the brazing clamps 32, 34 according to the present invention will now be described. The first step in such a method is to assemble a plurality of tubes and fins 36, 38 interleaved together into a subassembly. The side supports 40 are placed at the ends and the first clamp 32 is forced over this sub-assembly as shown in FIG. 6. The sub-assembly is placed on a conveyor and carried to a wash station. As described above, the stepped portion 58 of clamp 32 slides between rails 70 and the core is sprayed from jets 74.

After cleaning, the manifolds 42 are added to the cores and the second clamp 34 is placed over the core 30 as shown in FIG. 2. It should be apparent that each of the components of the heater core 22 are coated with the appropriate brazing flux and materials to accomplish the brazing of the core. The core is then placed into a brazing furnace. The core is heated to a temperature sufficient to cause the core to braze together followed by a cooling stage prior to removing the clamps 32, 34.

It should be readily apparent to those skilled in the art that various modification and alterations of the present invention are readily available without departing from the spirit and scope of the present invention. For example, the clamps may be formed from a variety of materials, such as stainless steel in the preferred embodiment, and in a variety of configurations to accommodate heat exchangers of various shapes and sizes. The contact portions of each of the leg members of both clamps may be coated with different materials, such as ceramics, to prevent sticking or brazing of the clamp to the core. The clamps may be utilized a multiple number of times and to braze other heat exchangers, not simply heater cores. Accordingly, it is the following claims, including all equivalents, which determine the scope of the invention.

What is claimed is:

1. An apparatus for holding a heat exchanger core during a manufacturing process, the core including first and second side support members disposed on opposite sides of an assembly of a plurality of interleaved tubes and fins, the core also including a first and second fluid tank disposed on opposite ends of said tubes, said apparatus comprising:

a first clamp disposed between said first and second side support members, said first clamp including a pair of leg members and a bight portion interconnecting said leg members, each of said leg members having a contact portion and an outwardly depending end portion, said contact portion being configured to contact said side support members and apply a compressive force therebetween, said bight portion including a stepped portion extending above the plane of said bight portion; and a second clamp extending between said first and second fluid tank and configured to apply a compressive force therebetween, whereby said first and second clamps apply a constant compressive force in two perpendicular directions against said core to hold said core together in a predetermined position during the manufacturing process and wherein said first and second clamps are removed from said heat exchanger core after the manufacturing operation is completed.

2. An apparatus according to claim 1, wherein said first clamp also includes means for preventing rotation of said core during a washing process.

3. An apparatus according to claim 2, wherein said means for preventing rotation of said core during a washing process comprises said stepped portion.

4. An apparatus according to claim 1, wherein said second clamp includes a pair of leg members and a bight portion interconnecting said leg members, each of said leg members having a contact portion being configured to contact said manifolds and apply a compressive force therebetween, said bight portion including a stepped portion extending above the plane of said bight portion.

5. An apparatus according to claim 4, wherein said leg members are disposed at an acute angle of less than ten degrees from the plane of the bight portion.

6. An apparatus according to claim 4, wherein said contact portions include a raised bump extending above the plane of the contact portion, the bump being configured to contact said manifolds when said clamp is placed over the manifolds.

7. An apparatus for holding a heat exchanger core during a manufacturing process, the core including first and second side support members disposed on opposite sides of an assembly of a plurality of interleaved tubes and fins, the core also including a first and second fluid tank disposed on opposite ends of said tubes, said apparatus comprising:

a first clamp disposed between said first and second side support members, said first clamp including a pair of leg members and a bight portion interconnecting said leg members, each of said leg members having a contact portion and an outwardly depending end portion, said contact portion being configured to contact said side supports members and apply a compressive force therebetween, said bight portion including a stepped portion extending above the plane of said bight portion, said stepped portion being configured to prevent rotation of said core during washing; and a second clamp extending between said first and second fluid tank and configured to apply a compressive force therebetween, said second clamp including a pair of leg members and a bight portion interconnecting said leg members, each of said leg members having a contact portion being configured to contact said manifolds and apply a compressive force therebetween, said bight portion including a stepped portion extending above the plane of said bight portion;

whereby said first and second clamps apply a constant compressive force in two perpendicular directions against said core to hold said core together in a predetermined position during the manufacturing process and wherein said first and second clamps are removed from said heat exchanger core after the manufacturing operation is completed.

8. An apparatus according to claim 7, wherein said leg members of said second clamp are disposed at an acute angle of less than ten degrees from the plane of the bight portion.

9. An apparatus according to claim 8, wherein said contact portions include a raised bump extending above the plane of the contact portion, the bump being configured to contact said manifolds when said clamp is placed over the manifolds.

\* \* \* \* \*

UNITED STATES PATENT AND TRADEMARK OFFICE
Certificate

Patent No.6,108,899                                                                                     Patented:August 29, 2000

On petition requesting issuance of a certificate for correction of inventorship pursuant to 35 U.S.C. 256, it has been found that the above-identified patent, through error and without deceptive intent, improperly sets forth the inventorship.

Accordingly, it is hereby certified that the correct inventorship of this patent is: Davide F. Piccirilli, Livonia, Michigan and Chester A. Ciesielski, Ontario, Canada Signed and Sealed this Eleventh Day of September 2001.

*TOM HUGHES*
*Supervisory Patent Examiner*
Art Unit 3726